United States Patent
Yamashita et al.

(10) Patent No.: US 12,378,126 B2
(45) Date of Patent: *Aug. 5, 2025

(54) COLLOIDAL SILICA, AND METHOD FOR PRODUCTION THEREOF

(71) Applicant: FUSO CHEMICAL CO., LTD., Osaka (JP)

(72) Inventors: Hiroaki Yamashita, Fukuchiyama (JP); Yuma Shibuichi, Fukuchiyama (JP); Yuka Fujimura, Fukuchiyama (JP)

(73) Assignee: FUSO CHEMICAL CO., LTD., Osaka (JP)

(*) Notice: Subject to any disclaimer, the term of this patent is extended or adjusted under 35 U.S.C. 154(b) by 927 days.

This patent is subject to a terminal disclaimer.

(21) Appl. No.: 17/436,177

(22) PCT Filed: Feb. 26, 2020

(86) PCT No.: PCT/JP2020/007580
§ 371 (c)(1),
(2) Date: Sep. 3, 2021

(87) PCT Pub. No.: WO2020/179557
PCT Pub. Date: Sep. 10, 2020

(65) Prior Publication Data
US 2022/0127150 A1    Apr. 28, 2022

(30) Foreign Application Priority Data

Mar. 6, 2019   (JP) ................... 2019-040724

(51) Int. Cl.
| | | |
|---|---|---|
| *C01B 33/141* | (2006.01) | |
| *B01J 31/02* | (2006.01) | |
| *C09G 1/02* | (2006.01) | |
| *C09K 3/14* | (2006.01) | |

(52) U.S. Cl.
CPC ......... *C01B 33/141* (2013.01); *B01J 31/0271* (2013.01); *C09G 1/02* (2013.01); *C09K 3/1409* (2013.01); *C01P 2004/64* (2013.01); *C01P 2006/10* (2013.01)

(58) Field of Classification Search
CPC .................................................. C01B 33/141
See application file for complete search history.

(56) References Cited

U.S. PATENT DOCUMENTS

| 2,680,721 A * | 6/1954 | Broge ................... C01B 33/146 516/81 |
| 4,301,027 A * | 11/1981 | Blumcke ................ G01N 33/52 436/183 |
| 8,529,787 B2 * | 9/2013 | Higuchi ................. C01B 33/14 423/325 |
| 9,422,457 B2 * | 8/2016 | Grumbine ................ C09G 1/00 |
| 11,691,885 B2 | 7/2023 | Omokawa et al. |
| 12,162,764 B2 * | 12/2024 | Fujimura ............... C01B 33/145 |
| 2008/0086951 A1 | 4/2008 | Wakamiya et al. |
| 2009/0253813 A1 | 10/2009 | Ishiguri et al. |
| 2010/0071272 A1 * | 3/2010 | Higuchi ................ C09K 3/1409 51/308 |
| 2010/0311871 A1 | 12/2010 | Suemura et al. |
| 2011/0163262 A1 | 7/2011 | Tiguchi et al. |
| 2011/0209413 A1 | 9/2011 | Nishida et al. |
| 2012/0276290 A1 | 11/2012 | Zhao et al. |
| 2013/0345461 A1 | 12/2013 | Bekiarian et al. |
| 2014/0335762 A1 | 11/2014 | Tamai et al. |
| 2015/0376018 A1 | 12/2015 | Suemura et al. |
| 2016/0130152 A1 | 5/2016 | Yoshitake et al. |
| 2016/0145110 A1 | 5/2016 | Suemura et al. |
| 2017/0001870 A1 | 1/2017 | Yoshitake et al. |
| 2018/0155591 A1 | 6/2018 | Kumazawa et al. |
| 2018/0208474 A1 | 7/2018 | Kim et al. |
| 2019/0010059 A1 | 1/2019 | Ashitaka et al. |
| 2019/0127230 A1 | 5/2019 | Taguchi et al. |
| 2020/0180968 A1 | 6/2020 | Ashitaka et al. |
| 2021/0061667 A1 | 3/2021 | Omokawa et al. |

(Continued)

FOREIGN PATENT DOCUMENTS

| CN | 102066252 A | 5/2011 |
| CN | 102164853 B | 12/2014 |
| CN | 105283413 A | 1/2016 |

(Continued)

OTHER PUBLICATIONS

Espacenet Machine Translation WO 2019049907 (Year: 2024).*
Tetramethoxysilane NIH Compound Summary (Year: 2024).*
Chinese Doctoral Dissertations & Master's Theses Full-text DatabaseEngineering Science and Technolog No. 1, 2016, with English abstract. (79 pages) cited in CN Office Action dated Nov. 17, 2023.
International Search Report dated Mar. 31, 2020, issued in counterpart International Application No. PCT/JP2020/007580 (3 pages).

(Continued)

*Primary Examiner* — Alexandra M Moore
(74) *Attorney, Agent, or Firm* — WHDA, LLP

(57) ABSTRACT

Colloidal silica containing silica particles that have a small particle size (e.g., an average primary particle size of 20 nm or less) and that contain alkoxy groups, and a method for producing the colloidal silica, are disclosed. The colloidal silica containing silica particles can have a small particle size and exhibit a suppressed increase in the average secondary particle size after storage. The colloidal silica containing silica particles wherein the silica particles have an average primary particle size of 20 nm or less, the silica particles have a ratio (m/n) of the content of alkoxy groups m (ppm) to the average primary particle size n (nm) of 300 or more, the silica particles have a particle density of 1.95 or more, and the silica particles have an increase rate of average secondary particle size of 12% or less in a storage stability test.

5 Claims, No Drawings

(56) References Cited

U.S. PATENT DOCUMENTS

2022/0127150 A1    4/2022    Yamashita et al.
2022/0177318 A1    6/2022    Otsuki et al.

FOREIGN PATENT DOCUMENTS

| | | |
|---|---|---|
| CN | 105813977 A | 7/2016 |
| CN | 107848811 A | 3/2018 |
| CN | 112299425 A | 2/2021 |
| CN | 112875710 A | 6/2021 |
| FR | 1251638 A | 1/1961 |
| JP | 6-316407 A | 11/1994 |
| JP | H06-316407 A | 11/1994 |
| JP | 2002-145609 A | 5/2002 |
| JP | 2004-315300 A | 11/2004 |
| JP | 2005-015323 A | 1/2005 |
| JP | 2007-153732 A | 6/2007 |
| JP | 2009-184856 A | 8/2009 |
| JP | 2010-058985 A | 3/2010 |
| JP | 2011-042522 A | 3/2011 |
| JP | 2011-201719 A | 10/2011 |
| JP | 5188175 B2 | 4/2013 |
| JP | 2013-082584 A | 5/2013 |
| JP | 2013-82584 A | 5/2013 |
| JP | 2016-8147 A | 1/2016 |
| JP | 2016-008157 A | 1/2016 |
| JP | 2016-8157 A | 1/2016 |
| JP | 2016-130290 A | 7/2016 |
| JP | 2017-154914 A | 9/2017 |
| JP | 2018-090798 A | 6/2018 |
| JP | 2018-90798 A | 6/2018 |
| JP | 6968632 B2 | 11/2021 |
| TW | 200831407 A | 8/2008 |
| TW | 201509808 A | 3/2015 |
| TW | 202039367 A | 11/2020 |
| TW | 202043149 A | 12/2020 |
| WO | 2008/123373 A1 | 10/2008 |
| WO | 2010/035613 A1 | 4/2010 |
| WO | 2010/052945 A1 | 5/2010 |
| WO | 2012/138365 A1 | 10/2012 |
| WO | 2017038777 A1 | 3/2017 |
| WO | 2017/170660 A1 | 10/2017 |
| WO | WO-2019049907 A1 * | 3/2019 ........... C01B 33/152 |

OTHER PUBLICATIONS

International Search Report dated Mar. 31, 2020, issued in International Application No. PCT/JP2020/007574 (counterpart to U.S. Appl. No. 17/436,335). (2 pages).

International Search Report dated Mar. 31, 2020, issued in application No. PCT/JP2020/007579 (counterpart to U.S. Appl. No. 17/436,126). (3 pages).

Sears, "Determination of Specific Surface Area of Colloidal Silica by Titration with Sodium Hydroxide", Analytical Chemistry, 1956, vol. 28, No. 12, pp. 1981-1983 (3 pages).

Non-Final Office Action dated Dec. 21, 2023, issued in U.S. Appl. No. 17/436,126. (13 pages).

Zhou et al., "Study on surface modification of inorganic nano-SiO2 particles", New Chemical Materials, 2015, vol. 43, No. 2, pp. 167-170, with English abstract, cited in CN Office Action dated Nov. 30, 2023. (4 pages).

Non-Final Office Action dated Jun. 12, 2024, issued in U.S. Appl. No. 17/436,126. (18 pages).

Non-Final Office Action dated Jul. 23, 2024, issued in U.S. Appl. No. 17/436,335. (26 pages).

International Search Report dated Mar. 31, 2020, issued in counterpart International Application No. PCT/JP2020/007585. (2 pages).

Chinese Doctoral Dissertations & Master's Theses Full-text Database Engineering Science and Technolog No. 1, 2016, pp. 1-67with English abstract, cited in CN Office Action dated Nov. 17, 2023. (79 pages).

Office Action dated Feb. 4, 2025, issued in counterpart JP Application No. 2024-016685, with English translation. (5 pages).

Non-Final Office Action dated Feb. 27, 2025, issued in U.S. Appl. No. 18/733,253. (13 pages).

* cited by examiner

COLLOIDAL SILICA, AND METHOD FOR PRODUCTION THEREOF

TECHNICAL FIELD

The present invention relates to colloidal silica and its production method. In particular, the present invention relates to colloidal silica containing silica particles with a small average primary particle size and its production method.

BACKGROUND ART

Colloidal silica, which is obtained by dispersing fine silica particles in a medium such as water, is used as a physical property improver in the fields of, for example, paper, textiles, and steel, and also used as an abrasive for electronic materials such as semiconductor wafers. The silica particles dispersed in colloidal silica used for these applications are required to have high particle density etc.

To produce colloidal silica that can meet the above requirements, for example, a production method in which a hydrolyzed solution obtained by hydrolyzing an alkoxysilane is added to a mother liquor that contains an alkaline catalyst etc. is disclosed (see, for example, Patent Literature (PTL) 1).

However, according to the production method disclosed in PTL 1, an alkoxysilane is hydrolyzed to prepare a hydrolyzed solution, and the hydrolyzed solution is then added to the mother liquor. This method can form particles with excellent compactness and a high particle density; however, the production process of this method involves multiple steps and is complicated and costly.

Further, since an alkoxysilane is once hydrolyzed in the production method of PTL 1, the resulting silica particles will contain a reduced amount of alkoxy groups. Thus, although high abrasiveness is achieved when polishing is performed with these silica particles, defects (e.g., scratches) undesirably increase on the surface of a substrate such as a polished object.

Furthermore, a method for producing colloidal silica by adding tetramethyl silicate or tetraethyl silicate to a mixed liquid of water with tetramethyl ammonium hydroxide, triethanolamine, or aqueous ammonia is disclosed (e.g., PTL 2 and PTL 3).

In addition, a method in which tetramethoxysilane and methanol are added dropwise to a liquid containing methanol, a small amount of water, and a small amount of aqueous ammonia is disclosed (e.g., PTL 4). PTL 4 discloses that the addition of a dispersion stabilizer such as ammonia can produce silica with a small particle size and excellent storage stability. However, abrasives for electronic materials such as semiconductor wafers are required to have high purity, and the addition of a dispersion stabilizer is undesirable.

Accordingly, development of colloidal silica with excellent abrasiveness is desired, and thus, development of a production method that enables simple production of the colloidal silica and reduces production costs is desired. Further, the patent documents mentioned above nowhere analyze the change in the particle size of silica with a small particle size after storage.

CITATION LIST

Patent Literature

PTL 1: WO 2008/123373
PTL 2: JP2007-153732A
PTL 3: JPH06-316407A
PTL 4: JP2004-315300A

SUMMARY OF INVENTION

Technical Problem

An object of the present invention is to provide colloidal silica containing silica particles that have a small particle size (e.g., an average primary particle size of 20 nm or less) and that contain alkoxy groups, and provide a method for producing the colloidal silica. Further, the inventors noticed problems of colloidal silica that contains silica particles with a small particle size. Specifically, such silica particles are likely to aggregate after storage, resulting in an increase in the average secondary particle size of the silica particles. Accordingly, another object of the present invention is to provide colloidal silica that contains silica particles with a small particle size and exhibits a suppressed increase in the average secondary particle size of the silica particles after storage, and provide a method for producing the colloidal silica.

Solution to Problem

The present inventors conducted extensive research to achieve the above objects, and consequently found that the objects can be achieved by a colloidal silica comprising silica particles, wherein the silica particles have an average primary particle size of 20 nm or less, the silica particles have a ratio (m/n) of the content of alkoxy groups m (ppm) to the average primary particle size n (nm) of 300 or more, and the silica particles have an increase rate of average secondary particle size of 12% or less in a storage stability test. The present invention has thus been completed.

The typical subject matter of the present invention is the following.

1. A colloidal silica comprising silica particles, wherein
    the silica particles have an average primary particle size of 20 nm or less,
    the silica particles have a ratio (m/n) of the content of alkoxy groups m (ppm) to the average primary particle size n (nm) of 300 or more,
    the silica particles have a particle density of 1.95 or more, and
    the silica particles have an increase rate of average secondary particle size of 12% or less in a storage stability test.
2. A colloidal silica comprising silica particles, wherein
    the silica particles have an average primary particle size of 20 nm or less,
    the silica particles have a particle density of 1.95 or more and 2.20 or less, and
    the silica particles have an increase rate of average secondary particle size of 12% or less in a storage stability test.
3. The colloidal silica according to claim 1 or 2, wherein the silica particles contain 5 μmol or more of at least one amine selected from the group consisting of a primary amine, a secondary amine, and a tertiary amine, per gram of the silica, wherein the amine contains no hydroxyl group as a substituent.
4. A method for producing colloidal silica comprising in series
    (1) step 1 of preparing a mother liquor containing an alkaline catalyst and water, (2) step 2 of adding an alkoxysilane to the mother liquor to prepare a mixed liquid, and (3) step 3 of adding an alkaline catalyst to the mixed liquid to prepare colloidal silica, wherein the alkaline catalyst is at least one amine selected from the group consisting of a primary amine, a secondary amine, and a tertiary amine wherein the amine contains no hydroxyl group as a substituent.

Advantageous Effects of Invention

The colloidal silica according to the present invention contains silica particles that have a particle size as small as an average primary particle size of 20 nm or less. The colloidal silica according to the present invention contains silica particles that have alkoxy groups. Additionally, the colloidal silica according to the present invention exhibits a suppressed increase in the average secondary particle size of the silica particles after storage. The method for producing colloidal silica according to the present invention also produces the colloidal silica according to the present invention in a simple manner.

DESCRIPTION OF EMBODIMENTS

The following describes in detail the colloidal silica and the method for producing the colloidal silica according to the present invention.

The silica particles in the colloidal silica according to the present invention have a particle size as small as an average primary particle size of 20 nm or less. Additionally, due to the silica particles having a high ratio of the content of alkoxy groups (ppm) to the average primary particle size (nm) of 300 or more, the colloidal silica according to the present invention used in abrasives can reduce defects (e.g., scratches) on the surface of a substrate such as a polished object. The colloidal silica according to the present invention is also excellent in storage stability because the colloidal silica exhibits decreased aggregation of silica particles or a suppressed increase in particle size of silica particles after storage of colloidal silica due to the increase rate of average secondary particle size of 12% or less in a storage stability test. Additionally, in an embodiment of the present invention, the colloidal silica is excellent in abrasiveness due to its high particle density.

The production method according to the present invention prepares a mother liquor containing an alkaline catalyst and water in step 1 and adds an alkoxysilane to the mother liquor to prepare a mixed liquid in step 2. Thus, unlike the method disclosed in PTL 1, the production method according to the present invention does not require an aqueous silicic acid solution to be prepared by hydrolyzing an alkoxysilane, and can produce colloidal silica containing silica particles that have a small particle size, a high content of alkoxy groups, and excellent storage stability in a simple manner. Additionally, the production method according to the present invention keeps the mother liquor prepared in step 1, which contains water (the main component) and an alkaline catalyst, at a high temperature, adds an alkoxysilane in step 2, and then further adds an alkaline catalyst in step 3 to prepare silica particles. Thus, the silica particles have a high particle density, enabling the production of colloidal silica excellent in abrasiveness in a simple manner.

1. Colloidal Silica

The silica particles contained in the colloidal silica according to the present invention have an average primary particle size of 20 nm or less, a ratio (m/n) of the content of alkoxy groups m (ppm) to the average primary particle size n (nm) of 300 or more, and an increase rate of average secondary particle size in a storage stability test of 12% or less.

The surface of the silica particles is preferably not modified with an organic functional group (e.g., an amino group or a sulfo group). Because silica particles whose surface is not modified with an organic functional group can maintain a high density of silanol groups on the surface of silica particles, such silica particles are useful in polishing an object that interacts with silanol groups.

The silica particles have an average primary particle size of preferably 20 nm or less, more preferably 18 nm or less, and still more preferably 16 nm or less. An upper limit of the average primary particle size falling within these ranges further increases the flatness of an object when the object is polished with the colloidal silica according to the present invention. The silica particles have an average primary particle size of preferably 6 nm or more, more preferably 8 nm or more, and still more preferably 11 nm or more. A lower limit of the average primary particle size of silica particles falling within these ranges further increases storage stability.

In the present specification, the average primary particle size of silica particles can be measured by the following measurement method. Specifically, colloidal silica is pre-dried on a hot plate and then heated at 800° C. for 1 hour to prepare a measurement sample. The BET specific surface area of the prepared measurement sample is measured. The average primary particle size (nm) of silica particles in the colloidal silica is calculated by using the value of 2727/BET specific surface area ($m^2/g$), regarding the density of silica particles as 2.2.

The silica particles have an average secondary particle size of preferably 10 nm or more, and more preferably 15 nm or more. A lower limit of the average secondary particle size of silica particles falling within these ranges further increases the storage stability of the colloidal silica according to the present invention. The silica particles also have an average secondary particle size of preferably 100 nm or less, and more preferably 70 nm or less. An upper limit of the average secondary particle size of silica particles falling within these ranges further lowers the low level of defectiveness in polishing an object with the colloidal silica according to the present invention. (In the present specification, "low level of defectiveness" means suppression of the formation of scratches during polishing.)

In the present specification, the average secondary particle size of silica particles can be measured by the following measurement method. Specifically, colloidal silica is added to a 0.3 wt % citric acid aqueous solution and homogenized to prepare a dynamic-light-scattering measurement sample. The average secondary particle size (unit: nm) of the measurement sample is measured by dynamic light scattering (ELSZ-2000S, produced by Otsuka Electronics Co., Ltd.).

The silica particles in colloidal silica have an aggregation ratio of preferably 1.0 or more, more preferably 1.2 or more, and still more preferably 1.3 or more. A lower limit of the aggregation ratio of silica particles falling within these ranges further increases the polishing rate in polishing an object with colloidal silica. The silica particles also have an aggregation ratio of 4.0 or less, and more preferably 3.0 or less. An upper limit of the aggregation ratio of silica particles falling within these ranges further increases the flatness of an object when the object is polished with colloidal silica.

In the present specification, the aggregation ratio of the silica particles in colloidal silica is a value determined by dividing the average secondary particle size by the average primary particle size of the silica particles in colloidal silica.

The silica particles may have a ratio (m/n) of the content of alkoxy groups m (unit: ppm) to the average primary particle size n (unit: nm) of 300 or more. This value refers to the amount of alkoxy groups present in the silica particles based on the size of silica particles. This value is preferably 300 or more, more preferably 350 or more, and still more preferably 400 or more. A lower limit of the value falling within these ranges further lowers the low level of defectiveness in polishing an object with the colloidal silica according to the present invention. The value is also preferably 2000 or less, and more preferably 1500 or less. An upper limit of the value falling within these ranges further increases the storage stability of colloidal silica.

The silica particles have a content of alkoxy groups m (unit: ppm) of preferably 1800 or more, more preferably 2400 or more, still more preferably 4000 or more, and particularly preferably 5000 or more. A lower limit of the value falling within these ranges further lowers the low level of defectiveness in polishing an object with the colloidal silica according to the present invention. m is preferably 40000 or less, and more preferably 30000 or less. An upper limit of the value falling within these ranges further increases the storage stability of colloidal silica.

In the present specification, the content of alkoxy groups m (unit: ppm) can be measured by the following measurement method. Specifically, colloidal silica is centrifuged at 215000 G for 90 minutes, and the supernatant is discarded. The solids are vacuum-dried at 60° C. for 90 minutes. 0.5 g of the obtained dry silica solids are weighed and added to 50 mL of a 1M aqueous sodium hydroxide solution, followed by heating the mixture at 50° C. for 24 hours with stirring to dissolve silica. The silica solution is analyzed by gas chromatography to determine the alcohol content, which is taken as the content of alkoxy groups. The detector for use in gas chromatography is a flame ionization detector (FID). Analysis by gas chromatography is performed in accordance with JIS K0114.

The silica particles may have an increase rate of average secondary particle size of 12% or less in a storage stability test. The increase rate is preferably 12% or less, more preferably 10% or less, and still more preferably 5% or less. An upper limit of the increase rate falling within these ranges further suppresses an increase in particles size or aggregation of silica particles in the colloidal silica according to the present invention after storage. The increase rate is also preferably −1% or more.

In the present specification, the increase rate of average secondary particle size (unit: %) of silica particles is determined based on a storage stability test. The details of this test are as follows. Specifically, first, the average secondary particle size a of target silica particles is measured. Second, a 100-mL plastic container is filled with colloidal silica containing the silica particles in a concentration of 20 mass % and water as a dispersion medium, sealed, and then allowed to stand in a thermostatic chamber at 60° C. After one week, the container is taken out from the thermostatic chamber, and the average secondary particle size b of the silica particles is measured. The percentage of the increase in average secondary particle size b after test from the average secondary particle size a before test is calculated from the following formula and determined to be the increase rate of average secondary particle size (%) in a storage stability test.

$(b-a)/a \times 100$ = increase rate of average secondary particle size (%)

The silica particles contained in the colloidal silica according to the present invention have a particle density of preferably 1.95 or more, and more preferably 2.00 or more. A lower limit of the particle density falling within these ranges further increases the abrasiveness of the colloidal silica according to the present invention. The silica particles also have a particle density of preferably 2.20 or less, and more preferably 2.16 or less. An upper limit of the particle density falling within these ranges further suppresses the formation of scratches on a polished object.

In the present specification, the particle density can be measured by drying and hardening colloidal silica on a hot plate at 150° C., keeping the sample in a furnace at 300° C. for 1 hour, and then measuring its particle density by a liquid-phase displacement method by using ethanol.

The silica particles preferably contain at least one amine selected from the group consisting of a primary amine, a secondary amine, and a tertiary amine wherein the amine contains no hydroxyl group as a substituent. The amine can be any amine, and is preferably an amine represented by the following formula (1).

$$NR_aR_bR_c \quad (1)$$

wherein $R_a$, $R_b$, and $R_c$ each represent an optionally substituted $C_{1-12}$ alkyl group or hydrogen; however, ammonia, in which $R_a$, $R_b$, and $R_c$ are all hydrogen, is excluded.

$R_a$, $R_b$, and $R_c$ may be the same or different. $R_a$, $R_b$, and $R_c$ may be linear or branched.

The number of carbon atoms of a linear or branched alkyl group may be 1 to 12, preferably 1 to 8, and more preferably 1 to 6. Examples of linear alkyl groups include a methyl group, an ethyl group, a propyl group, a butyl group, a pentyl group, a hexyl group, a heptyl group, and an octyl group. Examples of branched alkyl groups include an isopropyl group, a 1-methylbutyl group, a 2-methylbutyl group, a 3-methylbutyl group, a 1,1-dimethylpropyl group, a 1,2-dimethylpropyl group, a 2,2-dimethylpropyl group, a 1-methylpentyl group, a 2-methylpentyl group, a 3-methylpentyl group, a 4-methylpentyl group, a 1,1-dimethylbutyl group, a 1,2-dimethylbutyl group, a 1,3-dimethylbutyl group, a 2,2-dimethylbutyl group, a 2,3-dimethylbutyl group, a 1-methyl-1-ethylpropyl group, a 2-methyl-2-ethylpropyl group, a 1-ethylbutyl group, a 2-ethylbutyl group, a 1-ethylhexyl group, a 2-ethylhexyl group, a 3-ethylhexyl group, a 4-ethylhexyl group, and a 5-ethylhexyl group. Preferable linear or branched alkyl groups include a n-propyl group, a n-hexyl group, a 2-ethylhexyl group, and a n-octyl group.

The alkyl groups represented by $R_a$, $R_b$, and $R_c$ in formula (1) are optionally substituted. The number of substituents may be, for example, 0, 1, 2, 3, or 4, preferably 0, 1, or 2, and more preferably 0 or 1. An alkyl group with 0 substituents means an unsubstituted alkyl group. Examples of substituents include a $C_{1-3}$ alkoxy group (e.g., a methoxy group, an ethoxy group, a propoxy group, and an isopropoxy group), an amino group, a primary amino group substituted with a $C_{1-4}$ linear alkyl group, an amino group di-substituted with a $C_{1-4}$ linear alkyl group (e.g., a dimethylamino group and a di-n-butylamino group), and an unsubstituted amino group. However, the hydroxyl group is excluded from the substituents. In alkyl groups having multiple substituents, the substituents may be the same or different.

$R_a$, $R_b$, and $R_c$ in formula (1) may be an optionally substituted $C_{1-8}$ (preferably $C_{1-6}$) linear or branched alkyl group. $R_a$, $R_b$, and $R_c$ may be a $C_{1-8}$ (preferably $C_{1-6}$) linear or branched alkyl group optionally substituted with a $C_{1-3}$ alkoxy group.

$R_a$, $R_b$, and $R_c$ may be unsubstituted. Preferably, $R_a$, $R_b$, and $R_c$ are an unsubstituted linear or branched $C_{1-12}$ alkyl group, or a linear or branched $C_{1-12}$ alkyl group substituted with an alkoxy group. Amines in an embodiment include at least one amine selected from the group consisting of 3-ethoxypropylamine, pentylamine, hexylamine, dipropylamine, and triethylamine. Of these, 3-ethoxypropylamine, dipropylamine, and triethylamine are more preferable. From the standpoint of further increasing the storage stability of colloidal silica, 3-ethoxypropylamine is preferable.

The amines may be used singly, or in a combination of two or more.

The content of at least one amine selected from the group consisting of a primary amine, a secondary amine, and a tertiary amine (wherein the amine contains no hydroxyl group as a substituent) in silica particles is preferably 5 µmol or more, and more preferably 10 µmol or more, per gram of silica particles. A lower limit of the content of the amine falling within these ranges increases the content of deformed silica particles in colloidal silica, enabling colloidal silica to exhibit even more sufficient abrasiveness. The content of the amine is preferably 100 µmol or less, and more preferably 90 µmol or less, per gram of silica particles. An upper limit of the content of the amine falling within these ranges further increases the storage stability of colloidal silica.

The content of the amine can be measured by the following method. Specifically, colloidal silica is centrifuged at 215000 G for 90 minutes, and then the supernatant is discarded. The solids are vacuum-dried at 60° C. for 90 minutes. 0.5 g of the obtained dry silica solids are weighed and added to 50 ml of a 1M aqueous sodium hydroxide solution, followed by heating at 50° C. for 24 hours with stirring to dissolve silica. The silica solution is analyzed by ion chromatography to determine the amine content. Analysis by ion chromatography is performed in accordance with JIS K0127.

The boiling point of the amine is preferably 85° C. or more, and more preferably 90° C. or more. A lower limit of the boiling point falling within these ranges further suppresses vaporization during the reaction, and enables the amine to be suitably used as a catalyst. The upper limit of the boiling point of the amine is, although not particularly limited to, preferably 500° C. or less, and more preferably 300° C. or less.

2. Method for Producing Colloidal Silica

The method for producing colloidal silica according to the present invention includes in series
(1) step 1 of preparing a mother liquor containing an alkaline catalyst and water,
(2) step 2 of adding an alkoxysilane to the mother liquor to prepare a mixed liquid, and
(3) step 3 of adding an alkaline catalyst to the mixed liquid to prepare colloidal silica,
wherein the alkaline catalyst is at least one amine selected from the group consisting of a primary amine, a secondary amine, and a tertiary amine wherein the amine contains no hydroxyl group as a substituent. The production method according to the present invention is suitable for producing the colloidal silica according to the present invention.

Step 1

Step 1 is preparing a mother liquor containing an alkaline catalyst and water.

The alkaline catalyst may be at least one amine selected from the group consisting of a primary amine, a secondary amine, and a tertiary amine wherein the amine contains no hydroxyl group as a substituent. The amine for use can be those explained in the Colloidal Silica section above.

The content of the amine in the mother liquor is preferably 0.30 mmol or more, and more preferably 0.50 mmol or more, per kilogram of the mother liquor. A lower limit of the content of the amine falling within these ranges makes it easier to control the particle size. The content of the amine in the mother liquor is preferably 20.0 mmol or less, and more preferably 15.0 mmol or less, per kilogram of the mother liquor. An upper limit of the content of the amine falling within these ranges further increases the storage stability of colloidal silica.

The method for preparing the mother liquor can be any method. The mother liquor can be prepared by adding an alkaline catalyst to water by an ordinary method and stirring the mixture.

The pH of the mother liquor is, although not particularly limited to, preferably 9.5 or more, and more preferably 10.0 or more. A lower limit of the pH of the mother liquor falling within these ranges makes it easier to control the particle size. The pH of the mother liquor is preferably 12.0 or less, and more preferably 11.5 or less. An upper limit of the pH of the mother liquor falling within these ranges further increases the storage stability of colloidal silica.

Step 2

Step 2 is adding an alkoxysilane to the mother liquor to prepare a mixed liquid.

The alkoxysilane is not particularly limited, and includes an alkoxysilane represented by the following formula (2)

$$\text{Si}(OR_d)_4 \qquad (2)$$

wherein $R_d$ represents an alkyl group.

In formula (2), $R_d$ represents an alkyl group. $R_d$ can be any alkyl group, and is preferably a $C_{1-8}$ lower alkyl group, and more preferably a $C_{1-4}$ lower alkyl group. Specific examples of alkyl groups include a methyl group, an ethyl group, a propyl group, an isopropyl group, a butyl group, a pentyl group, and a hexyl group. The alkoxysilane represented by formula (2) is preferably tetramethoxysilane wherein $R_d$ is a methyl group (tetramethyl orthosilicate), tetraethoxysilane wherein $R_d$ is an ethyl group (tetraethyl orthosilicate), or tetraisopropoxysilane wherein $R_d$ is an isopropyl group; more preferably tetramethoxysilane wherein $R_d$ is a methyl group, or tetraethoxysilane wherein $R_d$ is an ethyl group; and still more preferably tetramethoxysilane.

The alkoxysilane represented by formula (2) may be a derivative. Examples of derivatives of the alkoxysilane include low condensates obtained by partially hydrolyzing the alkoxysilane represented by formula (2).

The alkoxysilane may be used singly, or in a combination of two or more. The alkoxysilane may be added all at one time or in divided portions (e.g., two times or three times).

The amount of the alkoxysilane in step 2 is not particularly limited. The molar ratio of the amount of the alkoxysilane in step 2 to the amount of the alkaline catalyst in the mother liquor prepared in step 1, which is the amount of the alkoxysilane (mol)/the amount of the alkaline catalyst in the mother liquor (mol), is preferably 10 or more, more preferably 100 or more, and still more preferably 150 or more. A lower limit of the amount of the alkoxysilane added falling within these ranges can further increase the content of silica particles in colloidal silica. The molar ratio of the amount of the alkoxysilane added to the amount of the alkaline catalyst in the mother liquor prepared in step 1 is preferably 8500 or less, and more preferably 8000 or less. An upper limit of the amount of the alkoxysilane added falling within these ranges makes it unlikely for gelation to occur during the reaction.

The time period for adding an alkoxysilane is preferably 5 minutes or more, and more preferably 10 minutes or more. A lower limit of the time period for addition falling within these ranges makes it unlikely for gelation to occur during the reaction. The time period for adding an alkoxysilane is preferably 1000 minutes or less, and more preferably 600 minutes or less. An upper limit of the time period for addition falling within these ranges further increases productivity and further reduces production costs.

The pH of the mixed liquid is preferably 8.5 or less, and more preferably 8.0 or less. An upper limit of the pH of the mixed liquid falling within these ranges further increases the storage stability of colloidal silica. The pH of the mixed liquid is preferably 4.5 or more, and more preferably 4.9 or more. A lower limit of the pH of the mixed liquid falling within these ranges makes it unlikely for gelation to occur.

The temperature of the mixed liquid in step 2 is preferably 70° C. or more, and more preferably 75° C. or more. A lower limit of the temperature of the mixed liquid falling within these ranges further makes it unlikely for gelation to occur during the reaction. The temperature of the mixed liquid is also preferably 95° C. or less, and more preferably 90° C. or less. An upper limit of the temperature of the mixed liquid falling within these ranges makes it unlikely for the alkoxysilane to vaporize.

Step 3

Step 3 is adding an alkaline catalyst to the mixed liquid to prepare colloidal silica.

The time period from the end of addition of the alkoxysilane until the start of addition of the alkaline catalyst in step 3 ("aging time" below) is preferably 0 minutes or more and 1440 minutes or less. The aging time enables the control of the degree of deformation. An aging time falling within these ranges provides particles with a desired degree of deformation while ensuring productivity.

The alkaline catalyst is at least one amine selected from the group consisting of a primary amine, a secondary amine, and a tertiary amine wherein the amine contains no hydroxyl group as a substituent. The amine for use can be those explained in the Colloidal Silica section above. The alkaline catalyst for use in step 3 may be the same as or different from the alkaline catalyst used in step 1.

The amount of the alkaline catalyst added in step 3 is not particularly limited. The molar ratio calculated as the amount of the alkoxysilane added in step 2 (mol)/the amount of the alkaline catalyst added in step 3 (mol) is preferably 30 or more, and more preferably 35 or more. An upper limit of the amount of the alkaline catalyst added falling within these ranges makes it unlikely for gelation to occur. The amount of the alkaline catalyst added indicated by the mole ratio above is preferably 500 or less, more preferably 400 or less, and still more preferably 300 or less. A lower limit of the amount of the alkaline catalyst added falling within these ranges makes it easier to control the particle size. The alkaline catalyst may be added all at one time or in divided portions (e.g., two times or three times).

In step 3, the alkaline catalyst diluted with a solvent such as water may be added as a diluent.

The pH of the liquid that has been mixed with an alkaline catalyst in step 3 is preferably 8.0 or more, and more preferably 8.5 or more. A lower limit of the pH of the liquid that has been mixed with an alkaline catalyst falling within these ranges makes it unlikely for gelation to occur. The pH of the liquid that has been mixed with an alkaline catalyst is also preferably 12.0 or less, and more preferably 11.0 or less. An upper limit of the pH of the liquid that has been mixed with an alkaline catalyst falling within these ranges makes it unlikely for silica to be dissolved.

The temperature of the liquid that has been mixed with an alkaline catalyst in step 3 is preferably 70° C. or more, and more preferably 75° C. or more. A lower limit of the temperature of the liquid that has been mixed with an alkaline catalyst falling within these ranges makes it easier to control the particle size. The temperature of the liquid that has been mixed with an alkaline catalyst is preferably 95° C. or less, and more preferably 90° C. or less. An upper limit of the temperature of the liquid that has been mixed with an alkaline catalyst falling within these ranges further makes it unlikely for gelation to occur.

The production method according to the present invention may further include, after step 3, the step of concentrating the colloidal silica. The concentration method is not particularly limited, and the colloidal silica may be concentrated by a known method. Examples of concentration methods include heat concentration at about 65 to 100° C.

The concentration of silica particles in concentrated colloidal silica is, although not particularly limited to, preferably about 10 to 50 mass % based on the colloidal silica taken as 100 mass %.

In the production method according to the present invention, the colloidal silica obtained in step 3 contains an alcohol generated as a by-product during the reaction and the organic solvent added in step 3. Thus, the production method may further include the step of distilling these organic solvents out of the system after step 3. The method for distilling the organic solvents out of the system is not particularly limited. An example for such methods is replacing the dispersion medium with pure water by adding pure water dropwise while heating the colloidal silica to maintain the volume at a constant level. Examples of other methods include a method of separating colloidal silica by precipitation, or separating colloidal silica from the solvent by centrifugation, and then re-dispersing the colloidal silica in water.

The colloidal silica according to the present invention contains metallic impurities, such as sodium, potassium, iron, aluminum, calcium, magnesium, titanium, nickel, chromium, copper, zinc, lead, silver, manganese, and cobalt, preferably in an amount of 1 ppm or less. Due to the content of metallic impurities of 1 ppm or less, the colloidal silica according to the present invention can suitably be used in polishing electronic materials and other like materials.

The colloidal silica according to the present invention is usable as a physical-properties improver in the areas of, for example, paper, fiber, and iron and steel, and also as an abrasive for electronic materials such as semiconductor wafers. The colloidal silica according to the present invention is also usable as an additive for filler, an external additive for toner, etc. by drying the colloidal silica into a powder form.

The scope of the present invention also encompasses an abrasive containing the colloidal silica described above. The colloidal silica according to the present invention contain silica particles that have an average primary particle size of 20 nm or less, a ratio (m/n) of the content of alkoxy groups m (ppm) to the average primary particle size n (nm) of 300 or more, and an increase rate of average secondary particle size of 12% or less in a storage stability test. Thus, the colloidal silica according to the present invention is suitable for use, in particular, in abrasives for chemical mechanical polishing of semiconductor wafers.

EXAMPLES

The present invention is described in detail below with reference to Examples etc. However, the present invention is not limited to the Examples etc.

Example 1

Step 1: 7500 g of pure water as a solvent was placed in a flask, and 11.64 g of 3-ethoxypropylamine (3-EOPA) as an alkaline catalyst was added thereto to prepare a mother liquor. The pH of the mother liquor was 11.3.
Step 2: The mother liquor was heated to an internal temperature of 85° C., and 2740 g of tetramethyl orthosilicate was added dropwise to the mother liquor at a constant rate over a period of 120 minutes while the temperature was adjusted to maintain the internal temperature. After completion of the dropwise addition, stirring was performed for 15 minutes to prepare a mixed liquid.
Step 3: 7.00 g of 3-ethoxypropylamine was added to the mixed liquid to prepare colloidal silica. The pH of the colloidal silica was 8.7.
The obtained colloidal silica was collected in an amount of 800 mL as a base amount under ordinary pressure, and then heated and concentrated so that the silica concentration was 20 wt %. Subsequently, while keeping the volume constant, the dispersion medium was replaced with 750 mL of pure water to distill off methanol, whereby colloidal silica dispersed in water was prepared. Table 1 shows the physical properties of the obtained colloidal silica dispersed in water.

Example 2

Step 1: 7500 g of pure water as a solvent was placed in a flask, and 0.7737 g of 3-ethoxypropylamine as an alkaline catalyst was added thereto to prepare a mother liquor. The pH of the mother liquor was 10.7.
Step 2: The mother liquor was heated to an internal temperature of 85° C., and 2740 g of tetramethyl orthosilicate was added dropwise to the mother liquor at a constant rate over a period of 60 minutes while the temperature was adjusted to maintain the internal temperature. After completion of the dropwise addition, stirring was performed for 60 minutes to prepare a mixed liquid.
Step 3: 28.0 g of 3-ethoxypropylamine was added to the mixed liquid to prepare colloidal silica. The pH of the colloidal silica was 9.6.
The obtained colloidal silica was collected in an amount of 800 mL as a base amount under ordinary pressure, and then heated and concentrated so that the silica concentration was 20 wt %. Subsequently, while keeping the volume constant, the dispersion medium was replaced with 480 mL of pure water to distill off methanol, whereby colloidal silica dispersed in water was prepared. Table 1 shows the physical properties of the obtained colloidal silica dispersed in water.

Example 3

Step 1: 7500 g of pure water as a solvent was placed in a flask, and 1.083 g of 3-ethoxypropylamine as an alkaline catalyst was added thereto to prepare a mother liquor.
Step 2: The mother liquor was heated to an internal temperature of 85° C., and 2740 g of tetramethyl orthosilicate was added dropwise to the mother liquor at a constant rate over a period of 60 minutes while the temperature was adjusted to maintain the internal temperature. After completion of the dropwise addition, stirring was performed for 15 minutes to prepare a mixed liquid.
Step 3: 24.00 g of 3-ethoxypropylamine was added to the mixed liquid to prepare colloidal silica. The pH of the colloidal silica was 9.3.
The obtained colloidal silica was collected in an amount of 850 mL as a base amount under ordinary pressure, and then heated and concentrated so that the silica concentration was 20 wt %. Subsequently, while keeping the volume constant, the dispersion medium was replaced with 1084 mL of pure water to distill off methanol, whereby colloidal silica dispersed in water was prepared. Table 1 shows the physical properties of the obtained colloidal silica dispersed in water.

Example 4

Step 1: 7500 g of pure water as a solvent was placed in a flask, and 1.776 g of 3-ethoxypropylamine as an alkaline catalyst was added thereto to prepare a mother liquor.
Step 2: The mother liquor was heated to an internal temperature of 85° C., and 2740 g of tetramethyl orthosilicate was added dropwise to the mother liquor at a constant rate over a period of 60 minutes while the temperature was adjusted to maintain the internal temperature. After completion of the dropwise addition, stirring was performed for 15 minutes to prepare a mixed liquid.
Step 3: 24.0 g of 3-ethoxypropylamine was added to the mixed liquid to prepare colloidal silica. The pH of the colloidal silica was 9.2.
The obtained colloidal silica was collected in an amount of 850 mL as a base amount under ordinary pressure, and then heated and concentrated so that the silica concentration was 20 wt %. Subsequently, while keeping the volume constant, the dispersion medium was replaced with 1084 mL of pure water to distill off methanol, whereby colloidal silica dispersed in water was prepared. Table 1 shows the physical properties of the obtained colloidal silica dispersed in water.

Comparative Example 1

Step 1: 6253 g of pure water as a solvent was placed in a flask, and 28.8 g of a 25 mass % aqueous solution of tetramethylanmonium hydroxide (TMAH) as an alkaline catalyst was added thereto to prepare a mother liquor. The pH of the mother liquor was 12.2.
Step 2: The mother liquor was heated to an internal temperature of 80° C., and 3330 g of tetramethyl orthosilicate was added dropwise to the mother liquor at a constant rate over a period of 240 minutes while the temperature was adjusted to maintain the internal temperature. After completion of the dropwise addition, stirring was performed for 15 minutes to prepare a mixed liquid.
The obtained colloidal silica was collected in an amount of 800 mL as a base amount under ordinary pressure, and then heated and concentrated so that the silica concentration was 20 wt %. Gelation was observed when heating and concentration were completed.

Comparative Example 2

Step 1: 8543 g of pure water as a solvent was placed in a flask, and 2.9475 g of triethanolamine (TEA) as an alkaline catalyst was added thereto to prepare a mother liquor. The pH of the mother liquor was 8.6.

Step 2: The mother liquor was heated to an internal temperature of 80° C., and 1533 g of tetramethyl orthosilicate was added dropwise to the mother liquor at a constant rate over a period of 180 minutes while the temperature was adjusted to maintain the internal temperature. After completion of the dropwise addition, stirring was performed for 15 minutes to prepare a mixed liquid.

The obtained colloidal silica was collected in an amount of 800 mL as a base amount under ordinary pressure, and then heated and concentrated so that the silica concentration was 20 wt %. Subsequently, while keeping the volume constant, the dispersion medium was replaced with pure water so that the liquid temperature was 100° C. to distill off methanol, whereby colloidal silica dispersed in water was prepared. Table 1 shows the physical properties of the obtained colloidal silica dispersed in water.

Comparative Example 3

Step 1: 5908 g of pure water as a solvent was placed in a flask, and 11.606 g of a 25 mass % aqueous solution of tetramethylammonium hydroxide as an alkaline catalyst was added thereto to prepare a mother liquor. The pH of the mother liquor was 11.9.
Step 2: The mother liquor was heated to an internal temperature of 80° C., and 713.3 g of tetraethyl orthosilicate was added dropwise to the mother liquor at a constant rate over a period of 96 minutes while the temperature was adjusted to maintain the internal temperature. After completion of the dropwise addition, stirring was performed for 15 minutes to prepare a mixed liquid.

The obtained colloidal silica was collected in an amount of 800 mL as a base amount under ordinary pressure, and then heated and concentrated so that the silica concentration was 20 wt %. Subsequently, while keeping the volume constant, the dispersion medium was replaced with pure water so that the liquid temperature was 95° C. to distill off methanol, whereby colloidal silica dispersed in water was prepared. Table 1 shows the physical properties of the obtained colloidal silica dispersed in water.

Comparative Example 4

Step 1: 5940 g of pure water as a solvent was placed in a flask, and 13.5803 g of a 27 mass % aqueous solution of ammonia ($NH_3$) as an alkaline catalyst was added thereto to prepare a mother liquor. The pH of the mother liquor was 11.2.
Step 2: The mother liquor was heated to an internal temperature of 80° C., and 713.3 g of tetraethyl orthosilicate was added dropwise to the mother liquor at a constant rate over a period of 84 minutes while the temperature was adjusted to maintain the internal temperature. After completion of the dropwise addition, stirring was performed for 15 minutes to prepare a mixed liquid.

The obtained colloidal silica was collected in an amount of 800 mL as a base amount under ordinary pressure, and then heated and concentrated so that the silica concentration was 20 wt %. Subsequently, while keeping the volume constant, the dispersion medium was replaced with pure water so that the liquid temperature was 95° C. to distill off methanol, whereby colloidal silica dispersed in water was prepared. Table 1 shows the physical properties of the obtained colloidal silica dispersed in water.

Comparative Example 5

0.16 g of a 1 mol/L aqueous solution of tetramethylammonium hydroxide was added to 891 g of water, and the mixture was stirred to prepare a mother liquor. The mother liquor was heated to reflux. Additionally, 205.2 g of tetramethyl orthosilicate was added to 2494.8 g of water to prepare an aqueous silicic acid solution. The aqueous silicic acid solution was continuously added dropwise to the mother liquor over a period of 4.5 hours under reflux. During the dropwise addition, a total of 10.0 g of a 1 mol/L solution of tetramethylammonium hydroxide was added to maintain the pH at about 8.

The obtained colloidal silica was collected in an amount of 400 mL as a base amount under ordinary pressure, and then heated and concentrated so that the silica concentration was 20 wt %. Subsequently, while keeping the volume constant, the dispersion medium was replaced with 200 mL of pure water to distill off methanol, whereby colloidal silica dispersed in water was prepared. Table 1 shows the physical properties of the obtained colloidal silica dispersed in water.

Comparative Example 6

Step 1: 10862 g of methanol and 552.9 g of pure water were placed as a solvent in a flask, and 124.17 g of a 27 mass % aqueous solution of ammonia as an alkaline catalyst was added thereto to prepare a mother liquor. The pH of the mother liquor was 11.2.
Step 2: The mother liquor was heated to an internal temperature of 60° C., and a mixture of 1331 g of tetramethyl orthosilicate and 630.7 g of methanol was added dropwise to the mother liquor at a constant rate over a period of 127 minutes while the temperature was adjusted to maintain the internal temperature. After completion of the dropwise addition, stirring was performed for 15 minutes to prepare a mixed liquid.

The obtained colloidal silica was collected in an amount of 800 mL as a base amount under ordinary pressure, and then heated and concentrated so that the silica concentration was 20 wt %. Gelation was observed when heating and concentration were completed.

Comparative Example 7

8102.3 g of methanol, 2359.0 g of pure water, and 469.9 g of 28 mass % aqueous ammonia were placed in a flask to prepare a mother liquor. After the mother liquor was heated to an internal temperature of 35° C., a mixed solution of 2214.1 g of tetramethyl orthosilicate and 600.7 g of methanol was added dropwise to the mother liquor at a constant rate over a period of 240 minutes with stirring while the temperature was adjusted to maintain the internal temperature. After completion of the dropwise addition, stirring was continued for 30 minutes to obtain a colloidal silica dispersion. The obtained colloidal silica dispersion was collected in an amount of 800 mL as a base amount under ordinary pressure, and then heated and concentrated so that the silica concentration was 20 wt %. Subsequently, while keeping the volume constant, the dispersion medium was replaced with 1200 mL of pure water to distill off methanol, whereby colloidal silica dispersed in water was prepared. Table 1 shows the physical properties of the obtained colloidal silica dispersed in water.

The physical properties of the colloidal silica of the Examples and Comparative Examples obtained as described above were evaluated according the following methods.
Average Primary Particle Size
Colloidal silica was pre-dried on a hot plate and then heated at 800° C. for 1 hour to prepare a measurement sample. The BET specific surface area of the prepared measurement sample was measured. The average primary particle size (nm) of silica particles in the colloidal silica was calculated by using the value of 2727/BET specific surface area (m²/g), regarding the density of silica particles as 2.2.

Average Secondary Particle Size

Colloidal silica was added to a 0.3 wt % citric acid aqueous solution and homogenized to prepare a dynamic-light-scattering measurement sample. The secondary particle size (nm) of the measurement sample was measured by dynamic light scattering (ELSZ-2000S, produced by Otsuka Electronics Co., Ltd.).

Aggregation Ratio

The aggregation ratio was calculated in accordance with the following formula: average secondary particle size/average primary particle size.

50° C. for 24 hours with stirring to dissolve silica. The silica solution was analyzed by ion chromatography to determine the amine content. Ion chromatography analysis was performed in accordance with JIS K0127.

Content of Alkoxy Groups

Colloidal silica was centrifuged at 215000 G for 90 minutes, and the supernatant was discarded. The solids were vacuum-dried at 60° C. for 90 minutes. 0.5 g of the obtained dry silica solids were weighed and added to 50 ml of a 1M aqueous sodium hydroxide solution, followed by heating at 50° C. for 24 hours with stirring to dissolve silica. The silica solution was analyzed by gas chromatography to determine the alcohol content, which was defined as the content of alkoxy groups. The detector for use in gas chromatography was a flame ionization detector (FID). Gas chromatography analysis was performed in accordance with JIS K0114.

TABLE 1

|  | Example | | | | Comparative Example | | | | | | |
| --- | --- | --- | --- | --- | --- | --- | --- | --- | --- | --- | --- |
|  | 1 | 2 | 3 | 4 | 1*¹ | 2 | 3 | 4 | 5 | 6*¹ | 7 |
| pH of colloidal silica replaced with water | 7.69 | 8.18 | 8.11 | 8.07 | — | 6.92 | 8.43 | 6.66 | 7.68 | — | 7.18 |
| Average primary particle size (nm) | 14.0 | 14.2 | 13.2 | 13.5 | — | 16.5 | 12.0 | 13.0 | 15.4 | — | 17.1 |
| Average secondary particle size (nm) | 18.3 | 36.2 | 28.4 | 23.3 | — | 25.6 | 20.1 | 23.8 | 20.6 | — | 26.6 |
| Aggregation ratio | 1.31 | 2.55 | 2.16 | 1.73 | — | 1.55 | 1.68 | 1.83 | 1.34 | — | 1.56 |
| Average secondary particle size after stability test (nm) | 18.1 | 36.4 | 28.1 | 23.3 | — | 29.3 | 22.8 | 34.7 | 20.1 | — | 27.2 |
| Average secondary particle size increase rate after stability test (%) | −1 | 1 | −1 | 0 | — | 14 | 13 | 46 | −2 | — | 2 |
| Particle density | 2.14 | 2.14 | 2.13 | 2.14 | — | 2.20 | 2.10 | 2.10 | 2.23 | — | 1.86 |
| Type of amine contained | 3-EOPA | 3-EOPA | 3-EOPA | 3-EOPA | TMAH | TEA | TMAH | $NH_3$ | TMAH | $NH_3$ | $NH_3$ |
| Amine content*² (μmol/g) | 58 | 78 | 76 | 87 | — | —*³ | —*³ | —*³ | —*³ | — | —*³ |
| Alkoxy group content (ppm) | 6303 | 8071 | 4632 | 6998 | — | 5086 | 5527 | 1431 | 4505 | — | 5695 |
| Alkoxy group content/average primary particle size (ppm/nm) | 450 | 568 | 352 | 520 | — | 308 | 461 | 110 | 293 | — | 333 |

*¹In Comparative Examples 1 and 6, gelation was observed during concentration.
*²In the table, the amine content refers to the content of at least one amine selected from the group consisting of a primary amine, a secondary amine, and a tertiary amine. (The hydroxyl group is excluded from the substituents.)
*³In Comparative Examples 2, 3, 4, 5, and 7 in the table, the amines described in *² were not detected.

Storage Stability Test and Average Secondary Particle Size Increase Rate

The average secondary particle size a of target silica particles was measured. Then, a 100-mL plastic container was filled with colloidal silica containing the silica particles in a concentration of 20 mass % and water as a dispersion medium, sealed, and then allowed to stand in a thermostatic chamber at 60° C. After one week, the container was taken out from the thermostatic chamber, and the average secondary particle size b of the silica particles was measured. The percentage of the increase in average secondary particle size b after test from the average secondary particle size a before test (b-a) was calculated from the following formula. The calculated value was determined to be the increase rate of average secondary particle size (%) in a storage stability test.

(b−a)/a×100=increase rate of average secondary particle size (%)

Particle Density

Colloidal silica was dried and hardened on a hot plate at 150° C. and kept in a furnace at 300° C. for 1 hour. Then, the particle density was measured by a liquid-phase displacement method by using ethanol.

Amine Content

Colloidal silica was centrifuged at 215000 G for 90 minutes, and the supernatant was discarded. The solids were vacuum-dried at 60° C. for 90 minutes. 0.5 g of the obtained dry silica solids were weighed and added to 50 ml of a 1M aqueous sodium hydroxide solution, followed by heating at

The invention claimed is:

1. A colloidal silica comprising silica particles, wherein
    the silica particles have an average primary particle size of 20 nm or less,
    the silica particles have a particle density of 1.95 or more and 2.20 or less, and
    the silica particles have an increase rate of average secondary particle size of 12% or less in a storage stability test.

2. The colloidal silica according to claim 1, wherein the silica particles contain 5 μmol or more of at least one amine selected from the group consisting of a primary amine, a secondary amine, and a tertiary amine, per gram of the silica, wherein the amine contains no hydroxyl group as a substituent.

3. A colloidal silica comprising silica particles, wherein
    the silica particles have an average primary particle size of 20 nm or less,
    the silica particles have a ratio (m/n) of the content of alkoxy groups m (ppm) to the average primary particle size n (nm) of 300 or more,
    the silica particles have a particle density of 1.95 or more, and
    the silica particles have an increase rate of average secondary particle size of 12% or less in a storage stability test.

4. The colloidal silica according to claim 3, wherein the silica particles contain 5 µmol or more of at least one amine selected from the group consisting of a primary amine, a secondary amine, and a tertiary amine, per gram of the silica, wherein the amine contains no hydroxyl group as a substituent.

5. A method for producing the colloidal silica according to claim 3 comprising in series
   (1) step 1 of preparing a mother liquor containing an alkaline catalyst and water,
   (2) step 2 of adding an alkoxysilane to the mother liquor to prepare a mixed liquid, and
   (3) step 3 of adding an alkaline catalyst to the mixed liquid to prepare the colloidal silica,
wherein the alkaline catalysts are at least one amine selected from the group consisting of a primary amine, a secondary amine, and a tertiary amine wherein the amine contains no hydroxyl group as a substituent.

* * * * *